United States Patent
Vittuari et al.

[11] Patent Number: 6,145,472
[45] Date of Patent: Nov. 14, 2000

[54] AUTOMATIC FEED DISTRIBUTION APPARATUS FOR ANIMALS

[76] Inventors: Emanuele Vittuari; Gabriele Vittuari, both of 465, via Porrettana; Maurizio Vittuari, 455, via Porrettana; Maria Rosa Vittuari, 465, via Porrettana, all of Casalecchio di Reno, Italy

[21] Appl. No.: 09/251,578

[22] Filed: Feb. 17, 1999

[30] Foreign Application Priority Data

Feb. 25, 1998 [EP] European Pat. Off. .............. 98830099

[51] Int. Cl.$^7$ ....................................................... A01K 5/02
[52] U.S. Cl. ........................................ 119/51.5; 119/51.02
[58] Field of Search ................................ 119/51.02, 51.5, 119/52.4, 53, 57.2, 57.5

[56] References Cited

U.S. PATENT DOCUMENTS

| | | | |
|---|---|---|---|
| 4,050,415 | 9/1977 | Conger | 119/51.5 |
| 4,422,409 | 12/1983 | Walker et al. | 119/51.5 |
| 4,461,240 | 7/1984 | Ostler | 119/51.02 |
| 4,733,634 | 3/1988 | Hooser | 119/51.5 |
| 4,735,171 | 4/1988 | Essex | 119/51.5 |
| 5,433,171 | 7/1995 | Ewell | 119/51.5 |
| 5,570,655 | 11/1996 | Targa | 119/51.02 |
| 5,778,820 | 7/1998 | Van Der Lely et al. | 119/51.02 |
| 5,819,686 | 10/1998 | Credeur | 119/51.5 |

*Primary Examiner*—Peter M. Poon
*Assistant Examiner*—Elizabeth Shaw
*Attorney, Agent, or Firm*—Reed Smith Shaw & McClay LLP

[57] ABSTRACT

A distribution apparatus including a separate compartment to hold and dispense both anhydrous feed in pellet form and liquid. In the compartment to dispense the anhydrous feed in pellet form from a feeding reservoir the dry feed reaches an under placed volumetric feeder activated by a motor reducer operated in response to information contained on a microprocessor card actuating the operator's preset functions on the control board. The anhydrous food falls then into a fodder-trough comes out operated by a translation system and the movement of which causes the rotation of the apparatus which senses the presence of feed and includes a linear support holding a rod having an intermediate upward bend ending, with the contact detector of the feed presence. As soon as the fodder-trough comes out, the bend allows a detector to lower down to touch the bottom of the fodder-trough permitting the card to detect the presence of residual food and to refill only the pre-determined quantity of feed fixed for the following meal. In the compartment containing the water, from a water tank the water reaches a drinking bowl. A level sensor detects either the water presence into the drinking bowl or the nonconsumption of water within a pre-determined fixed time sending all the signals detected on the control board.

20 Claims, 6 Drawing Sheets

AUTOMATIC FEED DISTRIBUTION APPARATUS FOR ANIMALS

BACKGROUND OF THE INVENTION

1. Field of the Invention

The invention relates to an automatic distribution unit to supply and dispense consumables such as liquid and anhydrous food in pellet form for consumption by an animal such as one or more family pets that can be fed without requiring the owner's presence.

2. Description of the Prior Art

Various systems exist which are directed to an apparatus that provide both food and water to animals such as pets without requiring any human supervision.

There exists a system featuring a volume distributor controlled by a timer in such a way that animals are fed at pre set times. This time-activated feed distributor has the drawback of only being able to approximate a dosage due to a lack of a direct proportionality between a number of revolutions of a volume proportioning distributor and its working time.

A double bulkhead volume proportioning distributor for horses is also in use today. This apparatus is solenoid controlled, and a feed quantity is contained between the two or double bulkheads which corresponds to a feed ration supplied every time it is operated. This apparatus, however, cannot be controlled any longer once the solenoids are activated. Moreover, in order to fill the reservoir between the two bulkheads, it is necessary to use an industrial vibrator integral with a feeding silo. Otherwise, any anhydrous food in pellet form would obstruct the hopper.

A gravity based feed reservoir system is also currently in use and ensures that necessary food and water is provided to the pets. The food and water falls into respective troughs. This apparatus, however, cannot control the amount of food that is dispensed.

In addition to the specific problems outlined, all of the above stated apparatus cannot verify whether any malfunction occurs during their working operations. In case of malfunction, these apparatuses cannot over come these failures in any way. For this reason, they operate as passive units and require presence of a control individual and therefore cannot replace the user's presence for long periods of time.

SUMMARY OF THE INVENTION

Therefore, it is among a main purpose of the invention to provide an automatic distribution apparatus to supply consumables to animals, particularly to cats and dogs, which can be fed without needing a owner's presence by means of a card programmed accordingly on an operator's control panel. Such consumables can include anhydrous food in pellet form or a liquid such as water.

The apparatus according to the teachings of the invention features a new and novel advance in the field with regard to passive mechanical operations through use of a volumetric screw feeder having a horizontal axis which ensures regular precise feeding operation even if the average size of the pellets vary. Thus, the same volumetric feed dispenser can be used with all sizes of pellets.

In addition, precision in the amount of consumables made available to the animals is ensured by a special motor reducer having inside a sensing contact of each turn or fraction thereof The amount of feed available to the animals can be programmed by the operator and the times of the feeding as well.

Another advantageous feature is that it can be placed outdoors due to an original movement of the fodder-trough which will turn to an outside position ready for use only in presence of the animal which is to be fed. Opening of the feeder-trough only takes place when the selected or intended animal or pet is present. This prevents other animals, such as predators, or even other animals, from eating the intended or selected pet's meal.

Moreover, an automatic heater is featured to prevent liquid, such as water from freezing. The apparatus according to the invention is tightly closed after food and liquids are made available to the pets so that the food cannot be reached by other small animals such as rats and squirrels nor by foreign bodies such as a child's arm.

Essentially, the invention substitutes the owner's physical presence completely by interacting at a distance with the owner through detailed information about the machine including operating conditions of the machine, including but not limited to correct working operations which ensures that the animal is fed during the owner's absence.

The best mode presently contemplated will now be described in detail.

DETAILED DESCRIPTION OF THE INVENTION

Figure 1:
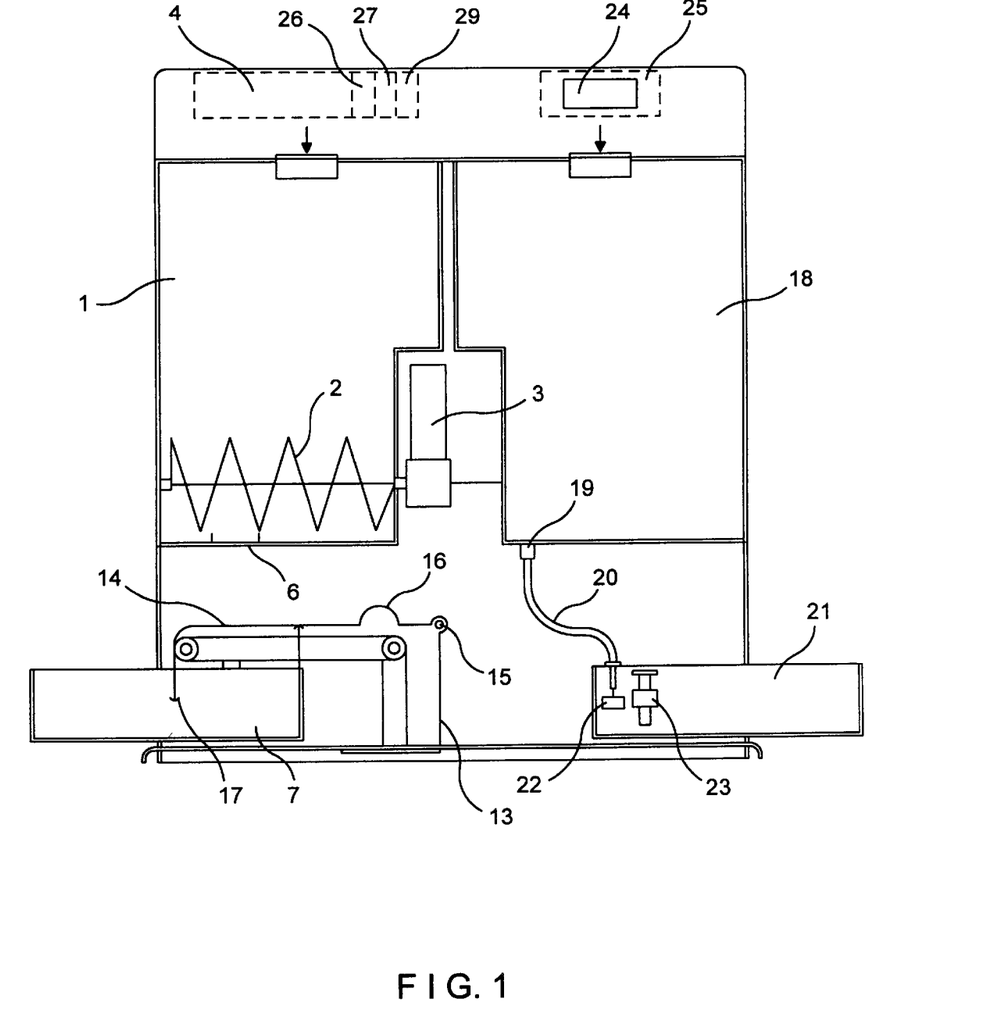
FIG. 1 is longitudinal sectional view of one embodiment of the invention to show the components of the apparatus.
Figure 3:
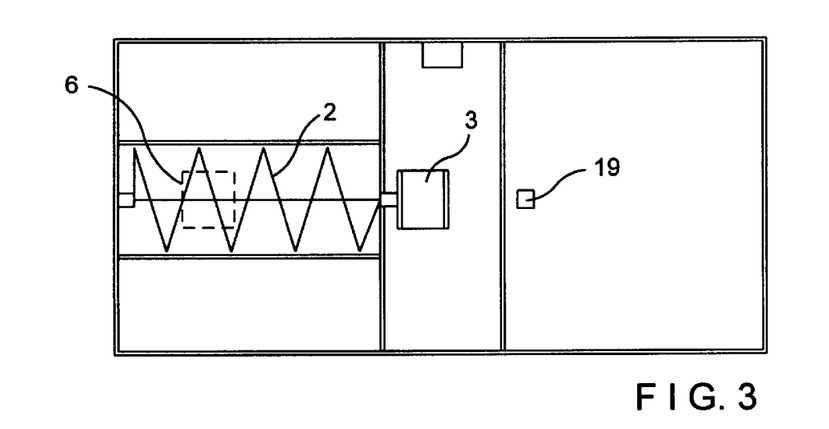
FIG. 3 is a transverse sectional view of one embodiment of the apparatus in its intermediate position to show both the feeding apparatus and the volumetric screw conveyor discharging the feed through the opening.

Referring to FIG. 1, reservoir 1 contains anhydrous feed in pellet form. The dry or anhydrous feed in pellet form in reservoir 1 is gravitationally fed to volumetric screw feeder 2. The screw feeder 2 is activated by a D.C. motor reducer 3. Microprocessor card 4 controls the operation of D.C. motor reducer 3. Opening 6 is located at the bottom of reservoir 1 which allows the anhydrous food in pellet form to fall into fodder-trough 7. As depicted in FIG. 3, opening 6 is only located in one part of reservoir 1 and is directly below volumetric screw feeder 2. In this manner, only a portion of the feed is allocated to fall into the fodder-trough 7 through opening 6. D.C. motor reducer 3 activates volumetric screw feeder 2 to move the allocated portion of feed in reservoir 1 to opening 6 and consequently to fodder-trough 7. Card 4 controls D.C. motor reducer 3 which in turn controls the allocation of the amount of feed that will be dispensed to fodder-trough 7. D.C. motor reducer 3 can also have a sensing contact of each turn or fraction of volumetric screw feeder 2 which enables precision in the amount of feed allocated to be moved to fodder-trough 7.

In this regard, microprocessor card 4 selects the amount of a consumable stored in reservoir 1 to be dispensed. Since an animal cannot reach the feed in reservoir 1, the card 4 can control the time and amount that the animal can access the food.

Figure 2:
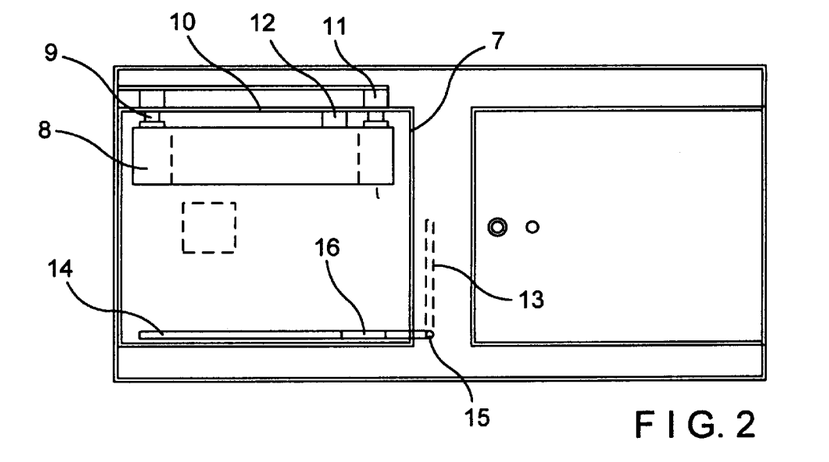
FIG. 2 is a transverse sectional view of one embodiment to show the bottom portion of the apparatus including the operation of the fodder-trough.

Fodder-trough 7 receives the dry feed and fodder-trough 7 can be extended out of the apparatus to allow access to the feed and dispense the feed to the animals. Fodder-trough 7 is extended by a translation system which elements are depicted are FIG. 2. Referring to FIG. 2, fodder-trough 7 is extended out of the apparatus by a translation system formed by a motor reducer 8 which is held and secured on base 9. The motor reducer 8 drags a toothed belt drive 10 revolving around toothed idler pulley 11. The toothed belt drive 10 is integral with fodder-trough 7 by means of blocking plate 12. In this manner, motor reducer 8 advances toothed belt drive 10 which moves fodder-trough 7 along with the toothed belt drive 10 such that fodder-trough 7 can be moved out of the apparatus. With fodder-trough 7 extended outside of the apparatus, the allocated feed in fodder-trough 7 will be dispensed to the animals.

Referring back to FIG. 1, a sensor determines the presence of feed in fodder-trough 7. The sensor is comprised of linear support 13 holding a rod 14 on which an angular potentiometer 15 is fixed in correspondence with support 13. The rod 14 has an intermediate upward bend 16 which ends with the contact detector 17 of the feed presence.

Figure 5:
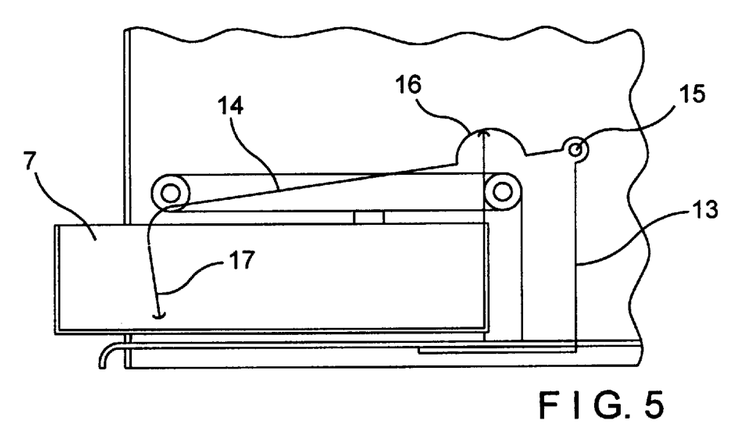
FIG. 5 is a longitudinal sectional view of one embodiment of the invention which depicts the fodder-trough and the translation system.

Referring to FIG. 5 for the operation of the sensing apparatus, movement of the fodder-trough 7 causes the rotation of the apparatus which senses the presence of feed instantly. The sensing apparatus will sense the emptying feeding reservoir 1 as well. As soon as the fodder-trough 7 comes out, bend 16 allows detector 17 to lower down to touch the bottom of the fodder-trough 7. Thus, the angular movement of the rod 14 will indicate the amount of feed still remaining in the fodder-trough 7. The greater the angular movement of the rod 14, the less feed that exists. In this manner, the sensing apparatus can determine a smaller angular movement of the rod 14 in presence of the residual food. The rod's smaller movement which indicates the amount of feed left in the fodder-trough will be detected by the card 4. With this information, the card 4 will only allow an amount to be dispensed in the fodder-trough such that only the pre-determined quantity of feed fixed for the following meal. This avoids the feed overflowing from the trough 7.

Referring back to FIG. 1, tank 18 which can contain a liquid to be dispensed to drinking bowl 21 through tap 19 and duct 20. Down flow of the liquid is regulated by float 22. Float 22 is situated directly below the opening of duct 20. When the level of the liquid in the bowl rises, float 22 will rise with the level and block the opening of duct 20. In this manner, the flow of liquid into bowl 21 is controlled and dependent on the amount of liquid already present.

Float sensor 23 detects the liquid's presence in the drinking bowl. Float sensor 23 can also detect the non-consumption of liquid within a pre-determined fixed time based on the difference between the rate of liquid flow from the float 22 and the consumption of liquid drunk by the animal. By comparison of the rate of liquid flow from tank 18 to the level of liquid existing in drinking bowl, the rate of consumption by the animals can be monitored.

Figure 4:
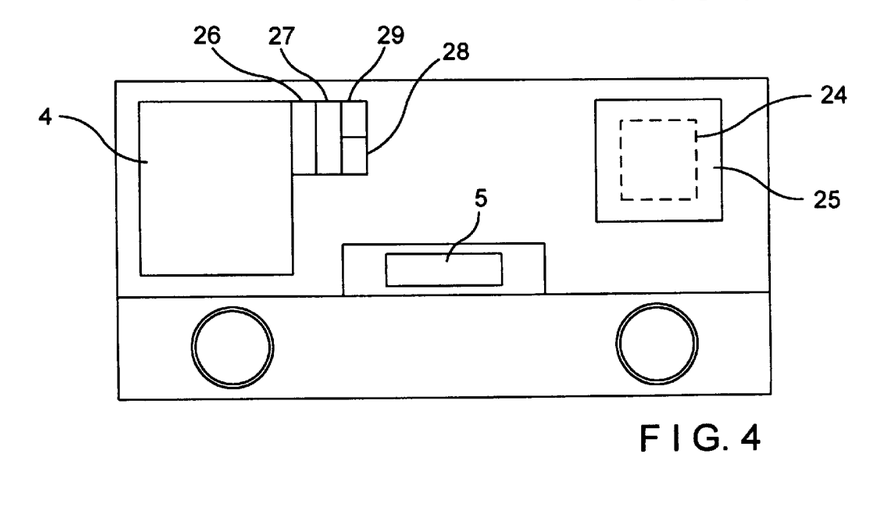
FIG. 4 is a transverse sectional view of one embodiment of the invention depicting the top view which shows the controlling units and the control boards.

In FIG. 4, control board 5 displays messages to the operator as well as enables the operator to program certain functions. The operator can also pre-set functions through a software menu on control board 5. These functions are processed through card 4 which will implement the functions through its control of the D.C. motor reducer 3 and the translation system. The card will then display the operation on the operator's control board 5.

The messages which are displayed on the control board 5 can be communicated to the operator through a communication apparatus such as telephone 24 placed inside special recess 25. such a apparatus can be operated by card 26 which is connected to the main card 4. Telephone 24 will also be connected to a remote receiving apparatus which was preset by the operator on the control board 5. In this manner, the apparatus contains a fail-safe communication method of alerting the operator in case of a malfunction or other emergency that could threaten the pets.

When fodder-trough 7 extends out of the apparatus, main card 4 activates a voice analog signal card 27 connected with a loudspeaker 28, where the operator will have pre-stored both the recall message of the animal mealtime and other alarm messages. For example, such messages can include "meal not eaten", "end of feed", "end of water" and "battery near exhaustion".

By means of receiver 29, connected with the main card 4, each single dispensed meal and the animal entitled to eat such meal can be paired to ensure that the proper animal is eating the feed. For this purpose, the same animal is fitted with a special collar containing a battery operated code transmitter. In the case that a code transmitted by the collar is not recognized by the receiver 29, the fodder-trough 7 does not come out or, if it is already out, it re-enters.

Figure 6:
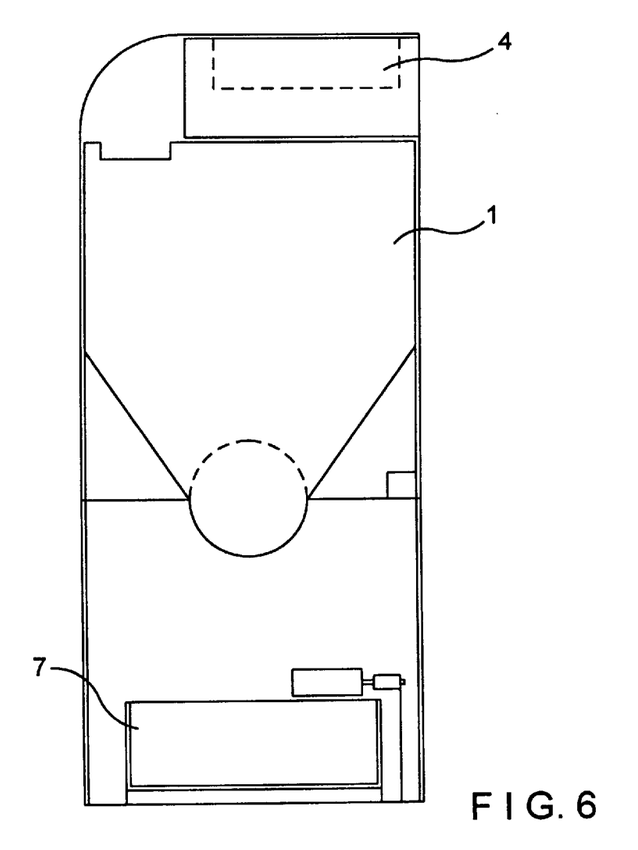
FIG. 6 is a longitudinal side view of one embodiment of the invention which depicts the feed dispenser and the fodder-trough.
Figure 7:
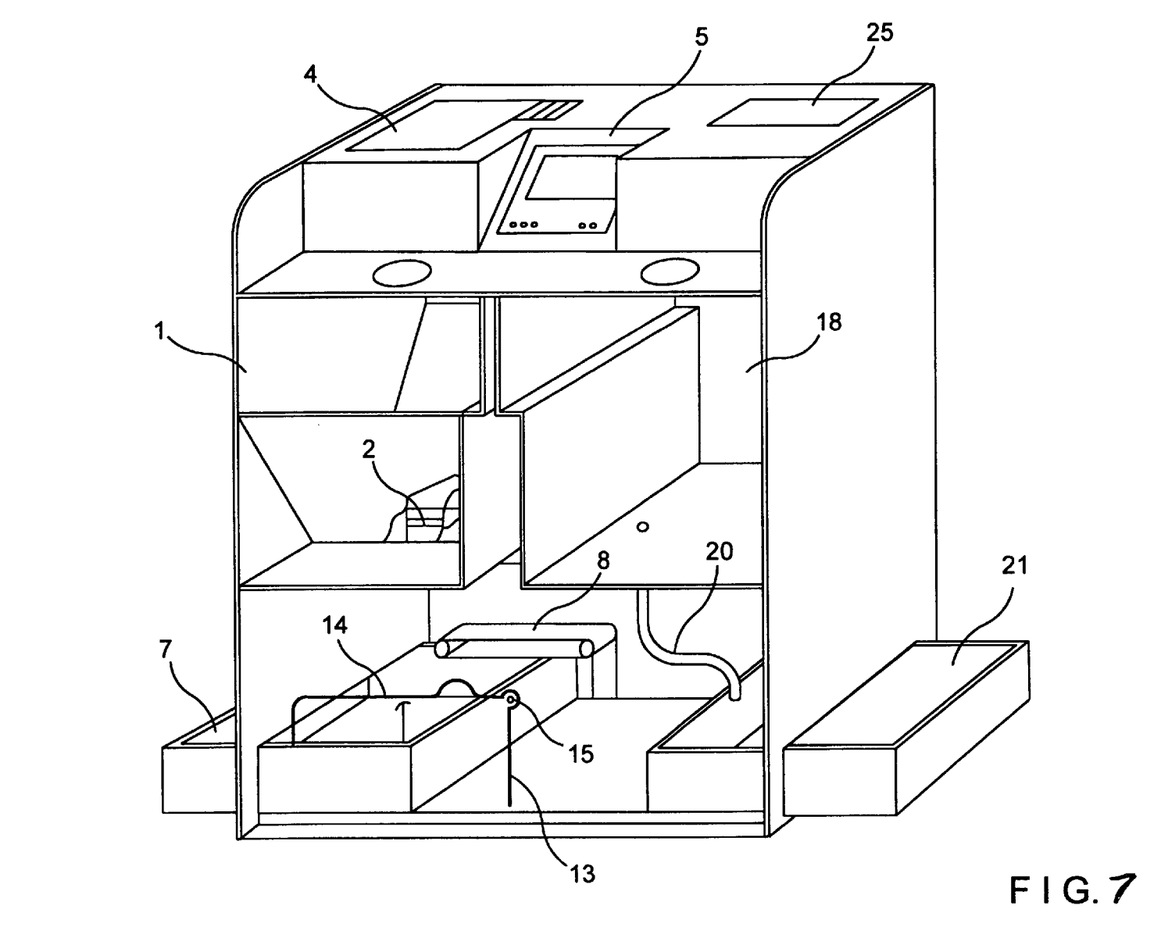
FIG. 7 shows a perspective view of the invention with side walls.

FIG. 6 depicts the spatial relationship between feeding reservoir 1 and the fodder-trough 7. As denoted, opening 6 is placed such that the feed will spill directly into the fodder-trough 7. FIG. 7 illustrates perspective view of one embodiment of the invention.

Figure 8:
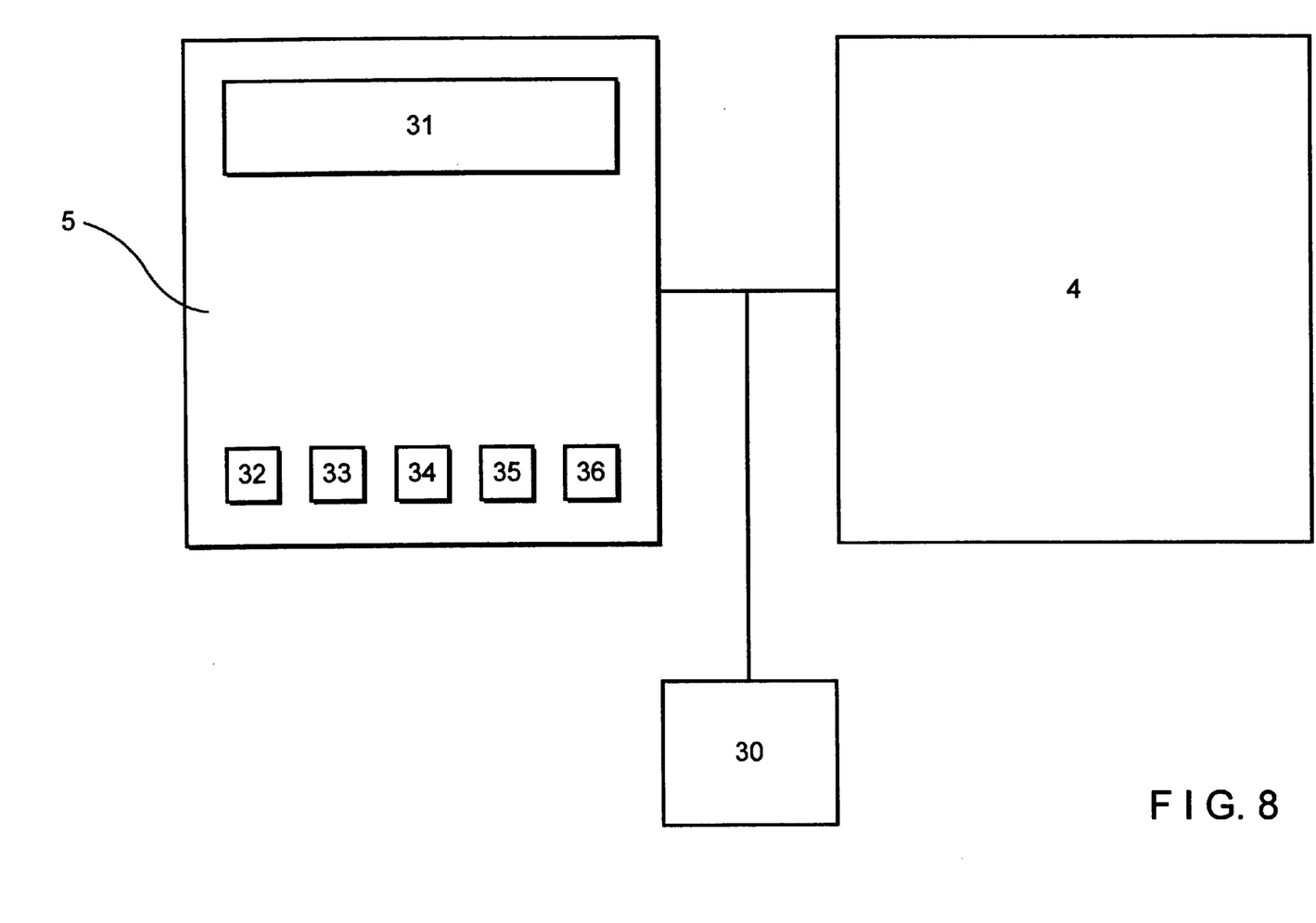
FIG. 8 shows a schematic diagram depicting the display and control panels.

As depicted in FIG. 8, the main card 4 and the control board 5 is alternatively operated by a battery 30, which allows an uninterrupted power supply even in case of a voltage drop at the mains. To preset the apparatus for usage, the operator sets out the operative functions needed on the control board 5 by means of a software menu shown on display 31. Such functions can include the following:

a) setting the clock;
b) setting out the first meal;
c) setting out the following meals;
d) setting the parameter of feed quantity for each turn of the volumetric screw feeder 2;
e) recording of messages on vocal synthesis 27; and
f) setting the alarm telephone numbers on the card 26.

These functions are selected by means of five keys: a key 32 to scroll the page display up one page, an enter key 33, a key 34 to scroll the page display down one page, an output key 35 and a reset key 36. The parameters set out in this way are transmitted on line to the main card 4.

Figure 9:
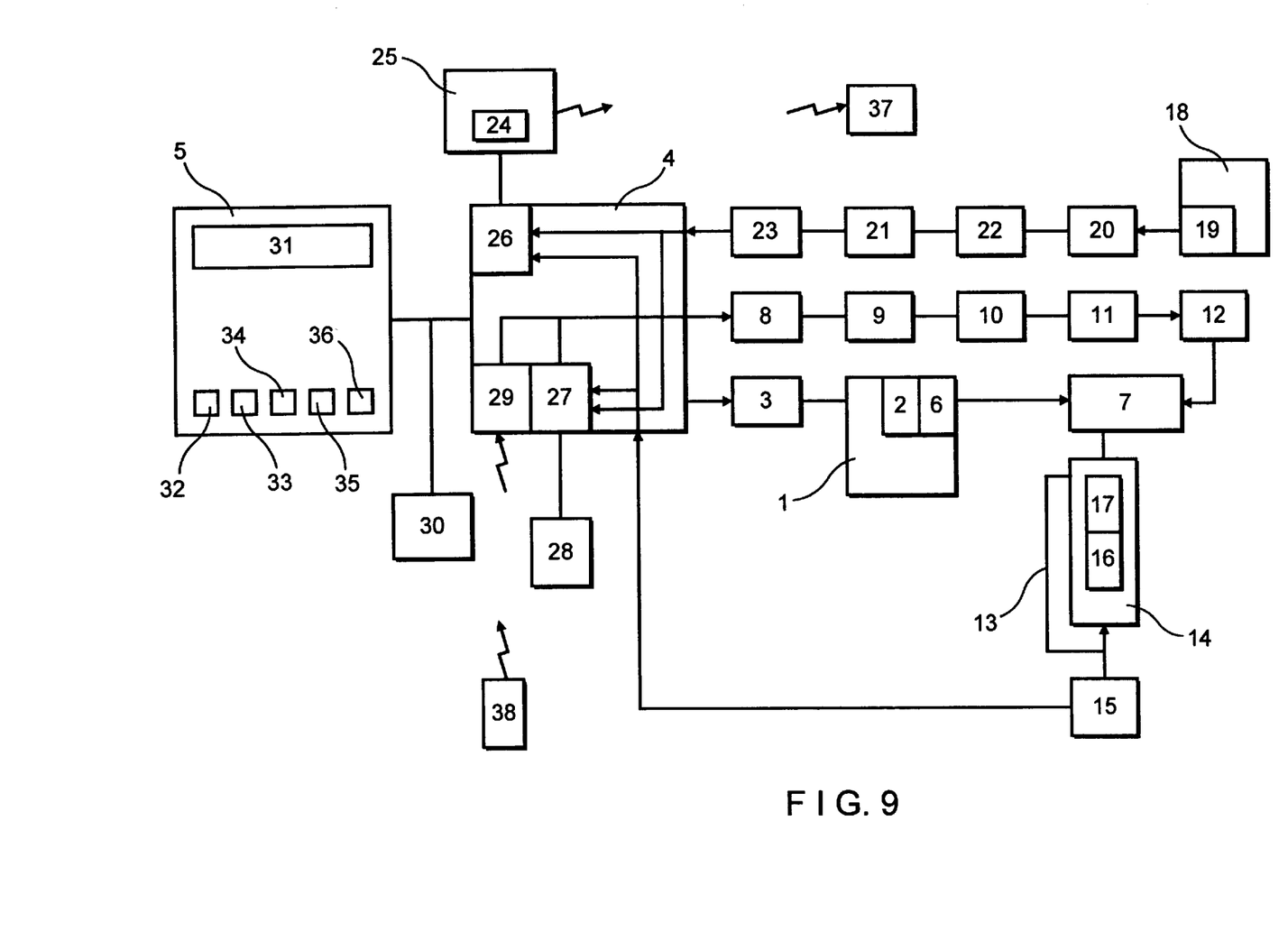
FIG. 9 shows block diagram of the functions which can be actuated by the invention as well as the apparatuses which effect the invention.

Operation of the unit is more thoroughly described in FIG. 9. Main card 4 is the central card, but the apparatus can contain other control cards specialized in vocal synthesis 27 for the receiver 29 of the collar code signal, vocal synthesizer 27 to broadcast verbal messages via speaker 28 and for the telephonic connection 24. The operation of main card 4 and other cards effectively functions as a communicator for the apparatus in contacting the operator or the animal itself.

The main card 4 will activate the motor reducer 3 to operate the volumetric feeder 2, which will discharge the feed from the storage reservoir 1 into the fodder-trough 7 through an opening 6. The card 4 will have the preset feed quantity which was programmed through the control board 5. The MPU logic card 4 will also activate the motor reducer 8 located on base 9 The motor reducer 8 drives a belt drive 10 turning onto another idle pulley 11 integral with the fodder-trough 7 by means of a blocking plate 12. Thus, the card 4 controls the filling of the fodder-trough and the opening and closing of the fodder-trough as well.

The logic card 4 receives feedback information from an angular potentiometer 15 which is connected with a support 13 on a rod 14, which has an intermediate bend 16 and a contact detector 17, so to signal the quantity of feed present into the fodder-trough 7. Additionally, the card 4 receives a signal from the level sensor 23 situated in the drinking trough 21 with a float 22 and connected with a water tank 18 through a flexible pipe 20 with a tap 19.

These feedback from the systems can also be utilized to initiate particular messages to be transmitted to the telephone message system or the speaker system. Action messages such as "meal not consumed", "end of feed", "end of water", "flat battery", "Rover, dinner" and so on are shown on display 31 and can be sent both to the vocal synthesis apparatus 27 and transmitted from the loudspeaker 28, or sent to the dialing card 26 connected with a telephone set 24, situated in a special recess 25, so to get into connection with the operator's telephone receiver 37. Moreover, the logic card 4, through a code receiver 29, performs the coupling function between the served meal and the animal entitled to eat it by means of a collar 38 through a battery-operated code transmitter.

While there is shown and described what is considered to be the preferred embodiments of the invention, it will be obvious to those skilled in the art that various changes may be made without departing from the scope of the invention.

What is claimed is:

1. An automatic food distribution apparatus for animals comprising:

means for allocating an amount of a consumable that is stored in a reservoir to be transferred from said reservoir;

means for dispensing the consumable to an animal, said dispensing means situated to receive said allocated amount of the consumable from the allocating means and capable of enabling and preventing access to the consumable by the animal;

means connected to said dispensing means for sensing the amount of the consumable that can be made accessible to the animal by the dispensing means;

means connected to said allocating means for communicating between an operator and the apparatus; and whereby said sensing means is activated when said dispensing means enables the animal access to the consumable and when said dispensing means prevents the animal access to the consumable.

2. An automatic food distribution apparatus as set forth in claim 1 wherein the dispensing means comprises:

a fodder-trough to hold the consumable, the fodder-trough being extendable out of the apparatus to allow access to the portion of the consumable;

means connected to said fodder-trough for extending and retracting the fodder-trough; and wherein the consumable is not accessible to the animal when the fodder-trough is not extended out of the apparatus.

3. An automatic food distribution apparatus as set forth in claim 2 wherein the allocating means comprises:

volumetric screw feeder for separating said allocated amount of the consumable to be transferred from the storage reservoir to the fodder-trough;

a motor reducer connected to said screw feeder for actuating the screw feeder to transfer the allocated amount of the consumable to the fodder-trough; and microprocessor means connected to said motor reducer to control the operation of the motor reducer.

4. An automatic food distribution apparatus as set forth in claim 2 wherein said sensing means comprises of a measuring rod; said measuring rod situated above said fodder-trough and capable of being lowered into said fodder-trough; and means to measure the distance that said measuring rod is lowered into said fodder trough.

5. An automatic food distribution apparatus as set forth in claim 1 further comprising:

a tap connected to the reservoir to allow a portion of a liquid consumable to flow out of the reservoir;

a bowl to retain the allocated portion of said liquid consumable, said bowl situated to receive the consumable from the reservoir and allow access to the consumable; and a float sensor connected to the tap to stop the portion of the consumable from flowing into the bowl.

6. An automatic food distribution apparatus as set forth in claim 1 wherein the communicating means enables the operator to preset operating conditions of the apparatus, said allocating means and said dispensing means being arranged to function according to the preset operating conditions.

7. An automatic food distribution apparatus as set forth in claim 6 wherein the allocated amount of consumable is selected such that the total amount of consumable that can be made accessible to the animal equals an amount that was preset by the operator.

8. An automatic food distribution apparatus as set forth in claim 1 wherein the dispensing means is responsive to the presence of a selected animal to allow the selected animal access to the consumable when the animal is near the apparatus.

9. An automatic food distribution apparatus as set forth in claim 8 wherein said dispensing means further comprises a sensor for detecting a selected signal from the selected animal to allow the selected animal access to the consumable.

10. An automatic food distribution apparatus as set forth in claim 1 wherein said communicating means is capable of communicating with said operator at a remote location.

11. An automatic food distribution apparatus as set forth in claim 1 wherein said communicating means comprises a speaker to transmit an audio message.

12. An automatic food distribution apparatus as set forth in claim 11 wherein the communication means will project an audio message to attract the animal to the apparatus when the fodder-trough is extended.

13. An automatic food distribution apparatus as set forth in claim 1 wherein the communicating means comprises of a display pad and buttons to enable communication between the operator and the apparatus.

14. An automatic food distribution apparatus as set forth in claim 1 wherein the consumable is in pellet form.

15. An automatic food distribution apparatus comprising:

a reservoir for holding a consumable; said reservoir being unaccessible to any animal;

an allocator connected to the reservoir for determining and selecting an amount of the consumable to be distributed to the animal;

a trough situated for receiving the allocated amount of consumable; said trough being movable in order to control when an animal physically has access to the allocated amount of consumable;

a sensor connected to the trough to monitor the amount of consumable in the trough; said sensor being activated when said trough is moved to control the animal's access to the consumable; and a communicator connected to the allocator and sensor for allowing an operator to interact with the apparatus.

16. An automatic food distribution apparatus as set forth in claim 15 wherein the communicator allows the operator to establish the amount of consumable to be accessible to the animal and the times that the consumable is accessible to the animal.

17. An automatic food distribution apparatus as set forth in claim 16 wherein the allocator will allot an amount of consumable such that the amount of consumable that is accessible to the animal in the trough does not exceed the amount of consumable to be fed to the animal.

18. An automatic food distribution apparatus comprising:

a micro-processing card for selecting an amount of a consumable stored in a reservoir to be dispensed to an animal; said reservoir being situated to prevent an animal from accessing the consumable stored in the reservoir; said card being capable of selecting the time when the selected amount of consumable is to be made accessible to the animal;

a dispenser connected to the reservoir for separating the selected amount of consumable from the consumable stored in the reservoir and for controlling when the animal physically has access to the determined amount;

a sensor connected to the dispenser for sensing the amount of the allocated portion of consumable that is accessible to the animal; said sensor activated when the dispenser allows the animal access to the determined amount of consumable;

a communicator connected to the microprocessor card for providing communication between an operator and the microprocessor card.

19. An automatic food distribution apparatus as set forth in claim 18 wherein the communicator enables the operator to program the amount and times that the selected amount of consumable is made accessible to the animal by the dispenser.

20. An automatic food distribution apparatus as set forth in claim 18 wherein the dispenser comprises a trough situated to receive and hold the selected portion of consumable; said trough being movable to allow access to the selected portion of consumable;

a volumetric screw feeder attached to the reservoir for separating the selected portion of consumable from the consumable in the reservoir;

a first motor reducer attached to the screw feeder for transferring the selected portion of consumable from the reservoir to the fodder-trough; and a second motor reducer attached to the trough for moving the trough such that the selected portion of consumable is accessible to the animal.

* * * * *